United States Patent

[11] 3,620,555

| [72] | Inventors | Fred C. Hinds<br>Richardson;<br>Donald R. Anthony, Dallas, both of Tex. |
|---|---|---|
| [21] | Appl. No. | 886,064 |
| [22] | Filed | Dec. 18, 1969 |
| [45] | Patented | Nov. 16, 1971 |
| [73] | Assignee | Atlantic Richfield Company<br>New York, N.Y. |

[54] CORROSION RESISTANT PIPE JOINT SYSTEM
6 Claims, 3 Drawing Figs.

[52] U.S. Cl. .................................................. 285/55, 285/383
[51] Int. Cl. .................................................. F16l 15/00
[50] Field of Search .................................................. 285/55, 383; 204/197, 148, 196, 147

[56] References Cited
UNITED STATES PATENTS

| 474,322 | 5/1892 | Harrington | 285/55 |
| 1,646,736 | 10/1927 | Mills | 204/197 |
| 1,705,197 | 3/1929 | Mills | 204/197 |
| 2,240,021 | 4/1941 | Rutherford | 285/55 X |
| 2,241,517 | 5/1941 | Moise | 285/55 |
| 2,887,446 | 5/1959 | Marx | 204/197 |
| 3,047,937 | 8/1962 | De Vecchi | 285/55 X |
| 3,253,841 | 5/1966 | Ahmad | 285/55 |
| 3,307,860 | 3/1967 | Blount et al. | 285/55 |

Primary Examiner—David J. Williamowsky
Assistant Examiner—Andrew V. Kundrat
Attorneys—Blucher S. Tharp and Roderick W. MacDonald ABSTRACT: A pipe joint system which resists corrosion comprising a coupling means joining at least two sections of metal pipe, an electrically insulating coating over the interior surface of the pipe, and at least one arcuate member carried in electrical contact with the coupling means, the arcuate member being more electronegative than the pipe and of a configuration such that the member does not extend substantially into the flow path of fluid through the pipe and coupling means.

PATENTED NOV 16 1971    3,620,555

INVENTORS
FRED C. HINDS
DONALD R. ANTHONY

Roderick W. MacDonald

ATTORNEY

CORROSION RESISTANT PIPE JOINT SYSTEM

BACKGROUND OF THE INVENTION

Heretofore it has been extremely difficult to render a pipeline or other conduit means corrosion resistant by the use of devices which could be disposed entirely within the pipeline. To protect the large interior surface of the pipeline against electrolytic corrosion for any substantial period of time, sacrificial anodes had to be used which were of such great bulk that they would substantially fill the pipeline itself and therefore interfere with the flow of fluid through the pipeline to an unacceptable degree.

SUMMARY OF THE INVENTION

According to this invention, an entire pipeline or other conduit means is rendered substantially corrosion resistant for extended periods of time using devices only on the interior of the pipeline. Further, these devices do not interfere with the normal flow of fluid through the pipeline.

The above mentioned advantages and other advantages obvious to those skilled in the art are achieved by this invention by employing individual pipe sections which have their interior surfaces coated with an electrically insulating (nonconductive) coating, the individual pipe sections being connected to one another to form the overall pipeline or other conduit means by the use of a coupling means that carries in the interior thereof at least one arcuate member. The arcuate member is in electrical contact with the coupling means and is composed of a metal more electronegative than the pipe sections. The arcuate member conforms to the interior curvature of the coupling means and has an internal diameter not substantially smaller than the smallest internal diameter of the pipe sections so that the arcuate member does not extend substantially into the normal flow path of fluid through the pipe sections and coupling means.

The insulating coating in the interior of the pipe reduces the metal surface area that must be protected with the sacrificial anode so that one or more arcuate members in one or more coupling means along the length of the pipeline can be employed and the configuration of the arcuate members maintained so as not to interfere with the normal flow path of fluid through the pipeline and so as to still have sufficient amounts of arcuate members present to act as sacrificial anodes for the remaining amount of the interior of the pipeline that is not covered by the electrically insulating coating. In this manner, an entire pipeline can be rendered substantially noncorrosive due to electrolytic mechanisms without having to employ any bulky devices external to the pipeline. Thus, the pipeline can be laid in the ground or otherwise emplaced in a normal manner without any consideration or special treatment required for rendering the pipeline corrosion resistant and at the same time not interfering with the normal flow of fluid through the pipeline in any manner.

Accordingly, it is the object of this invention to provide a new and improved system for rendering pipelines or other metal conduit systems corrosion resistant. It is another object to render metal conduit systems corrosion resistant for substantial periods of time without interfering with the internal substantial periods of time without the use of devices external to the conduit system and without interfering with the internal flow of fluid through that conduit system.

Other aspects, objects, and advantages of this invention will be apparent to those skilled in the art from this disclosure and the appended claims.

DETAILED DESCRIPTION OF THE INVENTION

Figure 1:
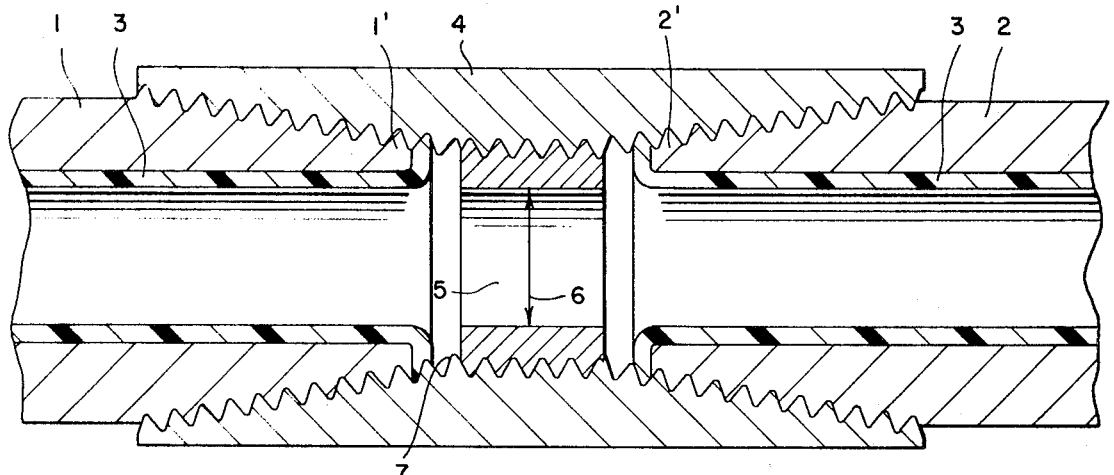
FIGS. 1 and 2 show pipe joint systems embodying this invention.

FIG. 1 shows individual and separate pipe sections 1 and 2, each lined with an electrically insulating layer 3 and joined to one another in an end-to-end relation by coupling means 4. The ends 1' and 2' of pipe sections 1 and 2 are spaced from one another in the coupling and in this space between pipe ends 1' and 2' there is emplaced arcuate member 5.

Arcuate member 5 in FIG. 1 is in an annular or ringlike configuration but can be employed in accordance with this invention in any other arcuate configuration which substantially conforms to the interior curvature of coupling 4 such as a half-ring, quarter-ring, and the like, as well as one or more subring segments spaced around the interior of coupling 4.

Arcuate member 5 is electrically connected by metal-to-metal contact between member 5 and coupling 4 and/or by welding, soldering, and the like.

Arcuate member 5 has an internal diameter 6 not substantially smaller than the smallest internal diameter of pipe sections 1 and 2 so that member 5 does not extend substantially into the normal flow path of fluid through pipe sections 1 and 2 and coupling 4. If pipe sections 1 and 2 are of substantially the same interior diameter, including the thickness of coating 3, the interior diameter 6 of member 5 should not be substantially smaller than the interior diameter of pipe sections 1 and 2. If one or the other of pipe sections 1 and 2 has a smaller interior diameter, including the thickness of coating 3, interior diameter 6 of member 5 should not be substantially smaller than the smallest interior diameter of the two pipe sections.

Coating 3 can be any electrically nonconductive coating of a thickness sufficient to insure electrical insulation of the internal metal surfaces of the pipe sections. Thus, coating 3 can be of substantially any electrically insulating material known in the art such as phenolic resins, epoxy resins, polyethylene, polypropylene, polyvinyl chloride, polybutadiene, combinations thereof including physical mixtures and copolymers, and other resinous or rubbery polymeric materials known in the art. Nonpolymeric insulating materials such as asbestos, cement, and the like can also be employed if desired.

Member 5 can be composed of any metal which is more electronegative than the metal which comprises pipe sections 1 and 2 or coupling 4. When pipe sections 1 and 2 and coupling 4 are composed of steel, member 5 can be composed of, for example, zinc, magnesium, aluminum, and mixtures thereof as desired so that in the case of any galvanic action in the interior of the pipeline, member 5 will be preferentially corroded with respect to pipe sections 1 and 2 and coupling 4. Member 5 can contain at least about 50 weight percent zinc based on the total weight of member 5 when the pipe sections and coupling means are composed of steel.

Since member 5 need only protect the exposed surface area 7, if any, between ends 1' and 2' and any part of the interior surface area of pipe sections 1 and 2 which may be exposed to the interior of the pipeline due to chipping, scratching, or otherwise breaking away of small portions of coating 3, the mass of member 5 need not be large in order to achieve long term corrosion resistance. Therefore, the configuration of member 5 can be made to conform with the interior configuration of coupling 4 without interfering with the flow path of fluid through coupling 4 and still provide sufficient sacrificial anode mass to give the pipeline long term corrosion resistance.

Member 5 must be in electrical contact with coupling 4. This can be accomplished by simple metal-to-metal contact such as by threading member 5 into coupling 4 as shown in FIG. 1. However, to insure the fluid in the pipeline does not force its way between coupling 4 and member 5, thereby electrically insulating member 5 from coupling 4 and preventing member 5 from functioning as a sacrificial anode, it is preferred that member 5 be electrically attached to coupling 4 such as by an electrically conductive glue, soldering, welding, or the like. For example, a solder composed essentially of from about 25 to about 75 weight percent lead based on the total weight of the solder can be employed, the remainder of the solder being essentially tin.

Figure 2:
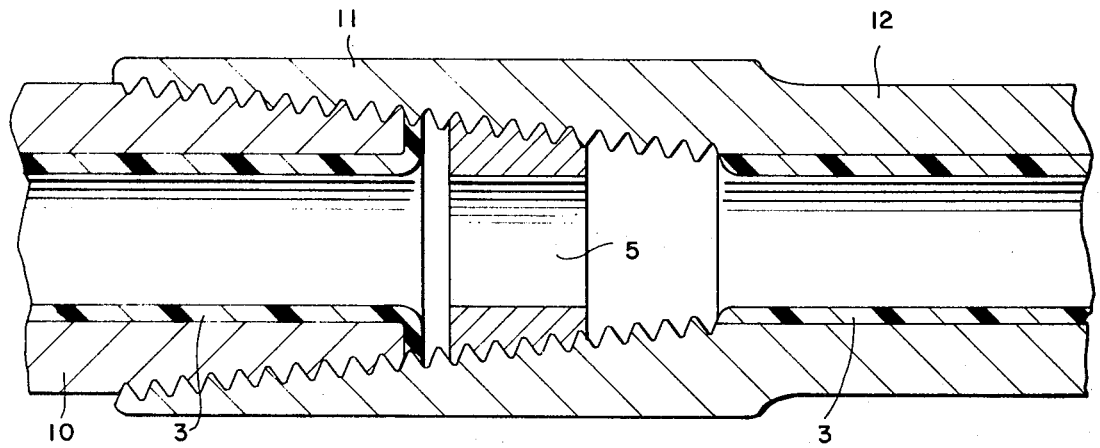

While FIG. 1 shows a coupling 4 which is separable from both pipe sections 1 and 2, this invention is applicable to all pipe coupling means. By way of example, FIG. 2 shows pipe section 10 threaded into a box type coupling means 11 which is integral with pipe section 12. Arcuate member 5 is fitted in box-end 11 and thereby, in effect, is emplaced between pipe sections 10 and 12 in a manner similar to that shown in FIG. 1 for nonintegral coupling 4.

Figure 3:
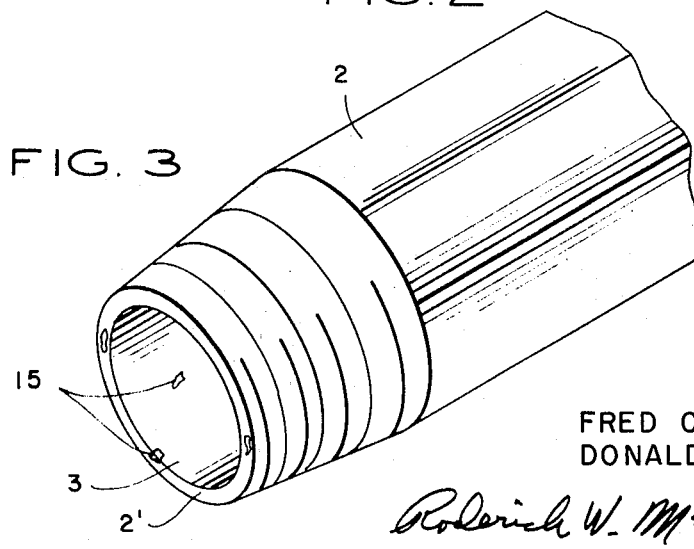
FIG. 3 shows an end view with a coated pipe section according to this invention.

FIG. 3 shows an end view of pipe sections 2 and end 2'. With normal handling during storage, transportation, emplacement, and the like, the insulating coating 3 will become chipped away in small portions 15 on the interior of pipe section 2 and particularly on end 2' thereby exposing the metal of pipe section 2 to the interior of the pipeline. Member 5 functions as a sacrificial anode for all exposed portions 15 as well as any exposed portion 7 of coupling 4, thereby working in cooperation with insulating coating 3 to provide overall corrosion resistance for the pipeline.

By way of example, a pipe joint system substantially the same as that shown in FIG. 1 was built using pipe sections and coupling means composed of API-J-55 Grade steel and an annular zinc ring containing 99 weight percent zinc, the remainder being substantially aluminum and cadmium, soldered to the interior of the coupling with a solder composed of about equal parts by weight of tin and lead. The pipe sections were coated on the interior with coal tar-epoxy in one section and polyvinyl chloride plastisol in the other.

A fluid composed of aerated tap water was passed through this pipe joint system for 2,500 hours at about 115° F., ambient conditions of pressure, and a velocity of 22 ft. B sec. After the 2,500 hour run the exposed metal 7 of the coupling between the ends of the pipe sections and the zinc ring and the exposed area 15 on the pipe sections were found to be coated with a layer of insoluble zinc salts thereby providing an effective corrosion barrier for all internal parts of the pipe joint system that were not covered by the insulating layer 3.

Reasonable variations and modifications are possible within the scope of this disclosure without departing from the spirit and scope of this invention.

The embodiments of the invention in which an exclusive property or privilege is claimed are defined as follows:

1. A corrosion resistant pipe joint system comprising a threaded pipe coupling means, at least two sections of metal pipe joined in an end-to-end relation by said threaded coupling means, an electrically insulating coating over substantially the entire interior surface of said pipes, at least one arcuate member carried in said coupling means, said arcuate member being located in said coupling means and sized in relation to said threaded coupling and pipe sections so as to be spaced from the adjacent ends of said pipe sections so that said arcuate member is exposed to the interior of said pipe system without touching the adjacent ends of said pipe sections to avoid chipping said insulating coating yet being sufficiently close to said pipe ends to function as a sacrificial anode for any chipped portions on the interior of said pipe sections, said arcuate member being in electrical contact with said coupling means and being composed of a metal more electronegative than the metal which composes said pipes and coupling means, said arcuate member substantially conforming to the interior curvature of said coupling means and having an internal diameter not substantially smaller than the smallest internal diameter of said pipes so that said arcuate member does not extend substantially into the flow path of fluid passing through said pipes and coupling means.

2. A system according to claim 1 wherein the ends of said pipes in said coupling means are spaced apart and said arcuate member is carried by said coupling means between said spaced apart pipe ends, and said arcuate member is annular in configuration.

3. A system according to claim 2 wherein said pipe is steel pipe lined with an electrically nonconducting polymeric layer, and said arcuate member contains at least about 50 percent, by weight based on the total weight of the ring of zinc.

4. A system according to claim 2 wherein said pipe is steel pipe lined with an electrically nonconducting polymeric layer, and said arcuate member contains at least about 50 percent, by weight based on the total weight of the ring of aluminum.

5. A system according to claim 3 wherein said arcuate member is soldered to said coupling means with a solder composed of from about 25 to about 75 weight percent lead based on the total weight of the solder, the remainder being essentially tin.

6. A system according to claim 4 wherein said arcuate member is joined to said coupling means with an electrically conductive glue.

* * * * *